May 11, 1965     H. J. STRAUSS     3,183,505
ELECTRONIC TIME COMPRESSION SYSTEM
Filed Dec. 20, 1962     3 Sheets-Sheet 1
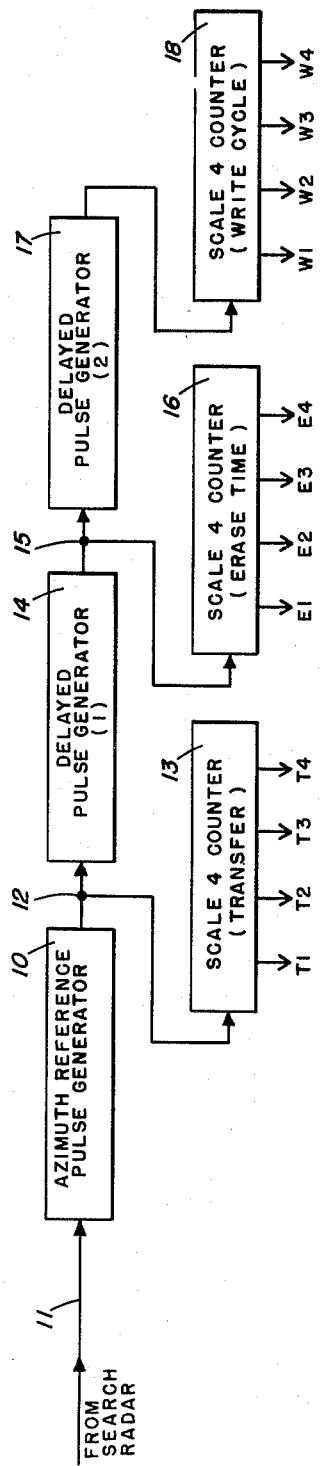
FIG. 1
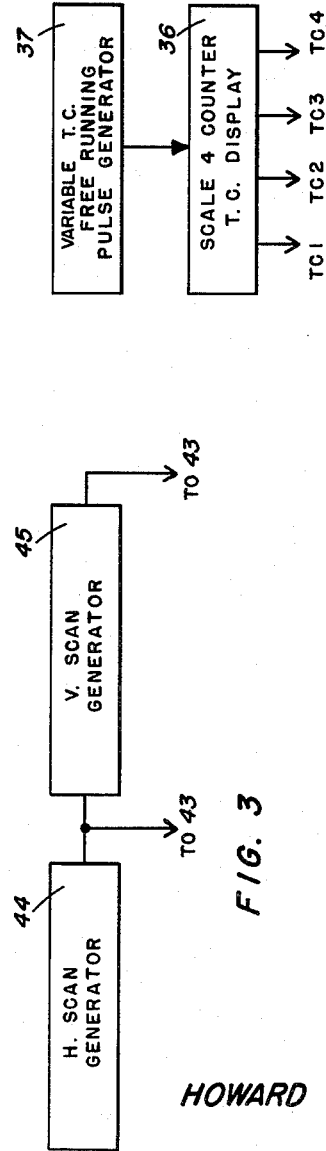
FIG. 4
FIG. 3
INVENTOR
HOWARD STRAUSS
Claude Funkhouser
ATTORNEY
James E. Snead AGENT ID 3,183,505
ELECTRONIC TIME COMPRESSION SYSTEM
Howard J. Strauss, Astoria, N.Y., assignor, by mesne assignments, to the United States of America as represented by the Secretary of the Navy
Filed Dec 20, 1962, Ser. No. 246,662
7 Claims. (Cl. 343—17.1)

The present invention pertains to an electronic time compression system which basically combines static and dynamic time compression into a single display, such as in a type P indicator for radar systems in which case it has the advantage of enhancing the ability of operators to detect targets in chaff and other noise environments.

Any technique which can store data for high-speed re-play such as the present invention is called a time compression technique. Another term that might be used is memory extension, because the storage process enables the observer to correlate events which appear to be independent of each other due to long time intervals between events. A well known example of time compression is elapsed-time photography, which permits observation and correlation of natural processes, such as the development of a flower from a seed to maturity.

The chief problem in any time compression system is that of information storage because even modest systems require very large memories. A solution often used in conjunction with radar systems is the use of guard rings where the memory need cover only a small sector. Another technique is the use of photographic storage. In the guard ring system, it may be necessary that the guard rings and, therefore, the memory may have to be large. For example, such a requirement is present in early warning radar depending on anticipated target course and velocity, although early warning radar may indicate the sector requiring surveillance. Photographic techniques necessarily involve delays. While development time can be reduced, the separation between the frame being photographed and the display unit results in a many-second delay. Schemes for cutting and transporting one frame at a time to the projector are mechanically complex. Other schemes which involve long separation between successive frames on the same film strip have the attendant disadvantages of film and projection devices. Still other known techniques utilize storage tubes and magnetic and thermoplastic tape, but these are often relatively complex.

Therefore, it is an object of the present invention to provide an electronic time compression system which combines a static and dynamic time compression into a single display unit.

It is another object of the present invention to provide an electronic time compression system which encompasses simple circuitry and is reliable in operation.

It is a further object of the present invention to provide a system which is fast acting.

Another object of the present invention is to provide a memory extension electronic circuit that correlates inputs over a long period of time which are independent of each other and widely spaced in time.

A further object of the present invention is to provide an electronic circuit for rapid display of data which has been provided to the circuit over widely spaced time intervals and which displays the data in proper time sequence and in rapid order, and which subsequently further displays the data as a continuous fading signal.

In order to enhance the detectability of targets on a search radar display, several kinds of such systems have been considered. By observing the history of a target, considerable information can be obtained regarding the target speed, its course, and its consequent threat to a defended area. By presenting rapid displays of several "radar looks" at the target, an effective speed-up of the target maneuver is obtained. This technique is conventionally referred to as time compression. Most attempts at generating time compressed displays utilize photographic or optical and photographic techniques. The utilization of electronic methods for pure time compression displays often becomes quite complex from a circuit and component point of view.

The basic philosophy of operation of the present system entails the sequential storing of consecutive type P radar displays on individual scan tubes. Upon completion of each type P revolution, a sequential counter is progressed so that the information received by the radar is cycled to another storage tube. In the present invention four storage tubes are used, and the cycling automatically progresses from storage tube 1 to 2, to 3, to 4, and back again to 1, to 2, etc. These storage tubes are then read out in the same order but at a much more rapid rate thereby achieving apparent increased target motion. In order to generate a target trail, the information which has ben stored for a total of four scan times is transferred from each particular storage tube to a fifth separate, integrated storage tube. By controlling the decay of the fifth storage tube a fading trail effect is obtained on the display unit. The fading effect is obtained because these scans which have been stored for a longer time will have decayed a greater amount than the most recently transferred ones and will so appear on the display unit.

The display presented to an operator will be generated by a television type raster scan. This method has the advantage that many individual monitor units can be used with this one system. In addition, by standardizing the television raster scan, many similar units can be electronically combined by very simple mixing schemes. The actual displays presented to an operator will consist of a fading target trail following the four time compressed presentations. The length of the fading trail and the number and frequency of the time compressed portion can be controlled by the operator. The decision to limit the time compressed displays to a four scan memory is merely a choice in designing the system and achieving a compromise by the instrument complexity and enhancement in target discernability and should not be taken as limiting the scope of the present invention.

A better understanding of the present invention may be obtained by reference to the following figures and their accompanying description wherein:

FIG. 1 is a block diagram of the portion of the present circuit which provides proper sequencing of the display information;

FIG. 3 is a block diagram of the horizontal and vertical scan generators of the present invention;

FIG. 4 is a block diagram of the time compression pulse generator and its counter;

Figure 2:
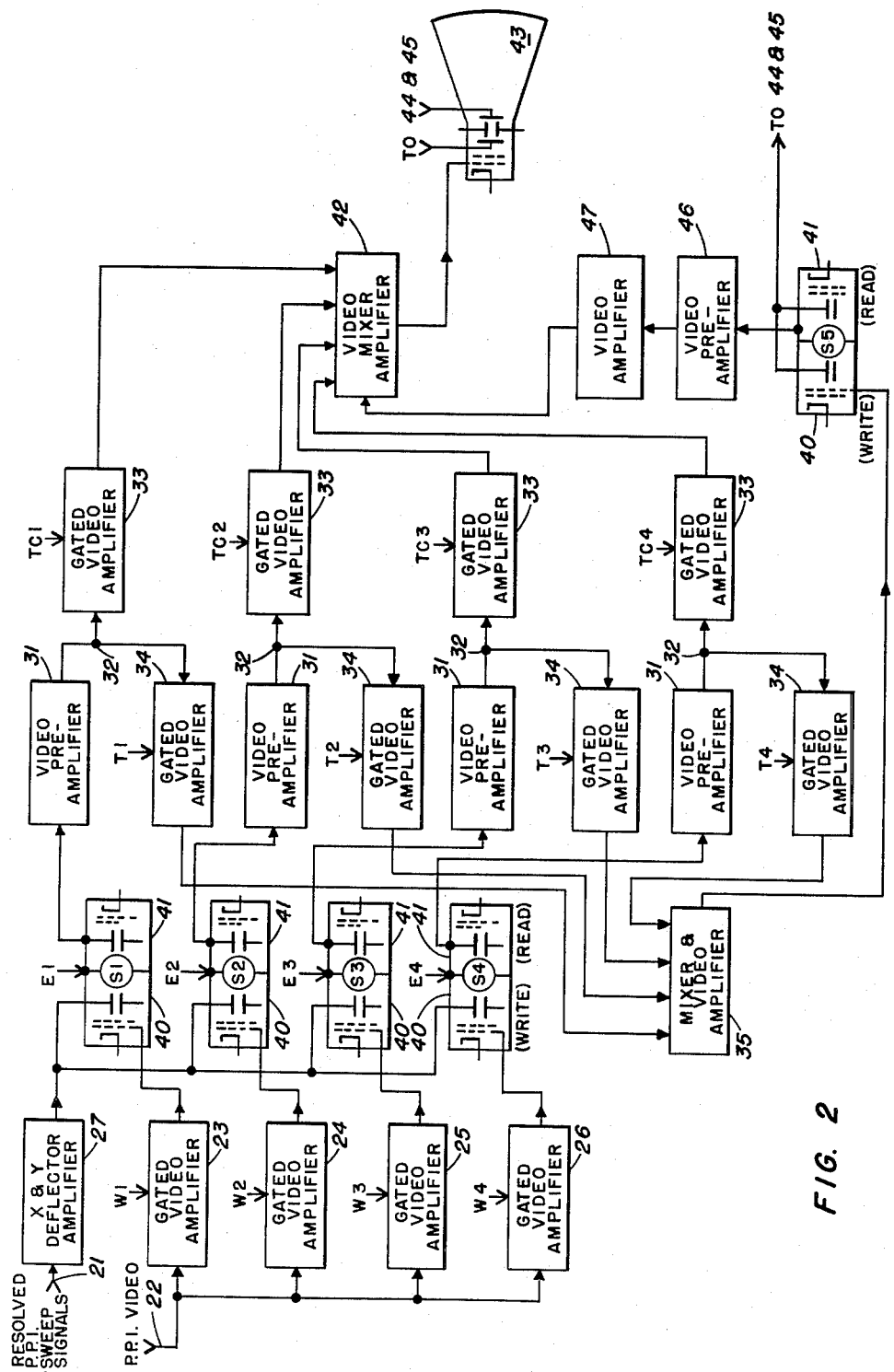
FIG. 2 is a partial block diagram of the main time compression circuit.

The system to be described consists of the combination of a trail display with a superimposed limited time compression of the four most recent radar looks. The system to be described includes five scan conversion storage tubes.

Referring now to FIG. 1, there is shown a block diagram of the portion of the circuit used in obtaining proper sequential operation of the time compression system. In order to accomplish the various functions of the system, a pulse from the search radar is fed into azimuth pulse generator 10. The pulse into input 11 serves as the master timing pulse to progress the system. The azimuth pulse generated in generator 10 is divided in the output 12 of generator 10 and fed respectively to the transfer counter 13 and to delay pulse generator 14. As will be hereinafter described, transfer counter 13 operates to transfer the information from the storage tubes S1, S2, S3, S4 to the trail display tube S5. Delay pulse generator 14, in response to the azimuth reference signal generator 10, generates a pulse which is divided at 15 and fed to erase time counter 16 and second delay pulse generator 17. Erase time counter 16, as will more clearly be shown later, serves to erase information from the storage tubes. Delay pulse generator 17 generates a signal which serves to actuate write cycle counter 18. This counter serves to trigger gated video amplifiers 23, 24, 25 and 26 (FIG. 2) which then pass the information to the storage tubes. This function will be described later with the funcion of the main time compression system.

The main time compression circuit is built around storage tubes S1, S2, S3, S4 and S5. Each tube comprises a write portion 40 and a read portion 41 as shown in FIG. 2. The input to storage tubes S1 through S4 consists of PPI video signals obtained from a search radar, for example, and which are transmitted to storage tubes S1 through S4 through gated video amplifiers 23, 24, 25 and 26, respectively. Gated video amplifiers 23 through 26 are actuated in sequence by write pulses W1 through W4, respectively, from write cycle counter 18 in FIG. 1. The write portions 40 of storage tubes S1 through S4 are connected to $x$ and $y$ deflection amplifier 27 which provides a resolved PPI sweep signal consisting of horizontal and vertical deflection signals. These signals are used to position the write beams of all four storage tubes. The read portions 41 are connected to horizontal and vertical scan generators 44 and 45, respectively, shown in FIG. 3 from whence the horizontal and vertical deflection is obtained for the read signal.

Erase pulses E1, E2, E3 and E4 are fed into storage tubes S1 through S4 sequentially from erase time counter 16 in a manner to be hereinafter described. The read portions of storage tubes S1 through S4 are each connected to video preamplifiers 31, respectively. The outputs of video preamplifiers 31, respectively, are coupled at junction 32 to two gated video amplifiers 33 and 34, respectively. Gated video amplifiers 33 are coupled to the video mixer amplifier 42 and thence to display cathode ray tube 43. These gated video amplifiers 33 are actuated by a signal from the compression pulse generator 37 through time compression counter 36. The time compression counter 36 is progressed by pulse generator 37, which generator is free-running with its frequency being determined by the operator. As will become more clearly understood in the following description, the frequency of pulse generator 37 determines the rate at which the time compression displays are repeated.

Gated video amplifiers 34, connected to the outputs of video preamplifiers 31 at junction 32, are each coupled into a mixer and video amplifier 35 which couples signals into the write portion of storage tube S5. The function of storage tube S5 is to provide a fading trail display on cathode ray tube 43 immediately after the fourth position is displayed from storage tubes S1 through S4 in the manner which will be more clearly described hereinafter.

Storage tube S5 obtains signal deflection in both its write section 40 and read section 41 electron guns from horizontal scan generator 44 and vertical scan generator 45 shown in FIG. 3. The output signal from storage tube S5 is fed into video mixer amplifier 42 through a video preamplifier 46 and a video amplifier 47.

For read-out from storage tubes S1 through S5, a horizontal and vertical television raster scan is used to deflect the read beams in all four storage tubes. This scan signal is obtained from horizontal scan generator 44 and vertical scan generator 45 shown in FIG. 3.

Figure 5:
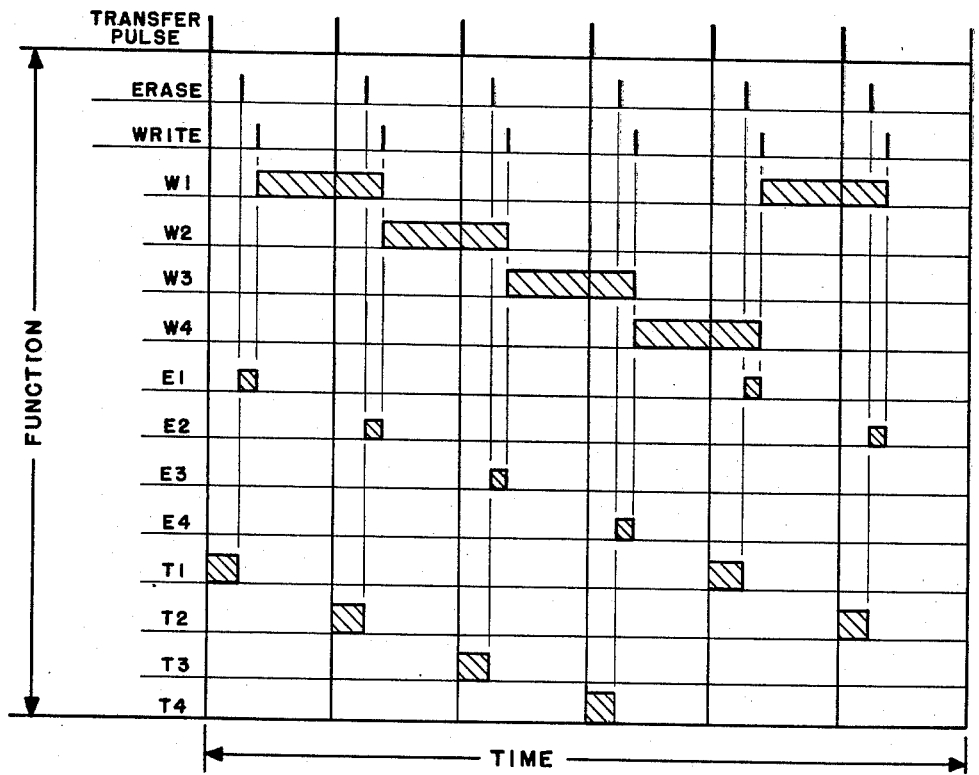
FIG. 5 is a diagram of the signal timing sequence of the present invention.

Reference can be made to FIG. 5 which shows a time plot of the relative pulses from each scale 4 counter. This includes transfer counter 13, erase time counter 16, and write cycle counter 18. These pulses are obtained from azimuth reference pulse generator 10, and each counter is actuated in sequence to transfer information from its respective storage tube, or to erase old information from each storage tube in sequence and/or to open gates 23 through 26, respectively.

In order to accomplish the various functions of the system, a pulse from azimuth reference pulse generator 10 serves as a master timing pulse to progress the time sequence of the system. An azimuth pulse generated by azimuth pulse generator 10 is then used to progress the scale of four transfer counter 13. This transfer counter 13 opens gated video amplifiers 34 for each of storage tubes S1 through S4 in sequence. Upon opening of each of gated video amplifiers 34 the information stored in storage tubes S1 through S4, respectively, is fed through mixer and video amplifier 35 to trail storage tube S5. The information is stored in storage tube S5 until it is read out at the end of the read-out cycle for tubes S1–S4. The pulse from azimuth generator 10 actuates delayed pulse generator 14 simultaneously with transfer counter 13 so that a pulse is provided at junction 15 to actuate erase counter 16 immediately after actuation of transfer counter 13. In this manner, immediately subsequent to transfer of information from each of storage tubes S1 through S4, an erase pulse is provided to each tube. As can be seen by reference to FIG. 5, these pulses are each actuated in sequence for each tube S1 through S4. The pulse at junction 15 from delayed pulse generator 14 actuates a second delayed pulse generator 17 simultaneously with erase time counter 16 so that a write pulse is provided to each of gated video amplifiers 23 through 26 in sequence immediately after the information in storage tubes S1 through S4 has been erased. A PPI video signal is provided from the radar at input 22 to gated video amplifiers 23 through 26. When one of these amplifiers, for instance 23, has been actuated by a write pulse, for instance W1, the radar information is transmitted to storage tube S1. Horizontal and vertical deflection signals consisting of resolved sweeps from the type P system are used to position the write beam of all four storage tubes. The video input to amplifiers 23 through 26 is used respectively to control the write beams of each of the four storage tubes.

For read-out on the storage tubes, a horizontal and vertical television raster scan is used to deflect the read beams of all four storage tubes. The video signal from the read-out portion of all four storage tubes S1 through S4 is first amplified by four separate video preamplifiers 31. In each case, the video preamplifier is followed at junction 32 by two gated video amplifiers 33 and 34. One of these gated video amplifiers is sequentially gated on in varying rapid sequence by output pulses from the scale-of-four counter 36 referred to as the time compression counter. As has been previously mentioned, the frequency of free-running time compression pulse generator 37 determines the rate at which the time compression displays are repeated, and its frequency in turn is controlled by an operator. The outputs of the gated video amplifiers 33 are all summed in a video mixer amplifier 42 to obtain the time compression portion of the display.

Before reading new information into storage tubes S1 through S4, it is desirable to extract all of the previous information from them and to thereafter clear them. The azimuth reference pulse is used to progress the transfer counter 13, so that the storage tube retaining the oldest information is read out into the trail generating storage tube S5. This is accomplished by actuating gated video amplifier 34 following each of storage tubes S1 through S4 by a pulse from the transfer counter 13. The video signals are then combined, amplified in mixer and amplifier 35, and are then introduced into the write portion 40 of trail generating storage tube S5. Consequently, the oldest information from storage tubes S1 through S4 is superimposed on storage tube S5. The rate of information decay from storage tube S5 is controlled by an operator. Depending on the type storage tube used, the decay time adjustment can be either a potential adjustment on storage tube S5 itself or an adjustment of the number of partial erasures introduced into the tube.

An erase gate is generated by erase counter 16 into each of storage tubes S1 through S4 in sequence just after the information transfer from each tube to the trail generating storage tube S5, and prior to the introduction of new video information into each tube. As an example of typical storage tubes, conventional tubes have an erase time of the order of one tenth of a second which would be the length of the erase gate.

In consequence of the operation of the present time compression system, a display is provided on cathode ray 43 which indicates in a controlled amount of time at least four successive positions of a target being observed by a radar, and at the end of the fourth position indicator a fading trail display is provided on the screen which indicates the last four previous positions of the target in such a manner that the earliest position fades from the screen first. The disclosed system provides a constant intensity display. The television raster scan type display of the present invention permits many repeat monitors, and can be integrated with existing scan conversion systems, the system displaying decaying intensity trails, the fading rate being operator controlled.

Obviously many modifications and variations of the present invention are possible in the light of the above teachings. It is, therefore, to be understood that within the scope of the appended claims the invention may be practiced otherwise than as specifically described.

What is claimed is:

1. In a radar tracking system having an electronic time compression system, the combination comprising:

input means for receiving a plurality of electronic signals corresponding to a number of target return signals of an object being tracked by radar;

a plurality of storage means for separately storing each of the plurality of signals from said input means;

write means electrically connected to said input means for controlling the passage of signals from said input means to said storage means;

said write means being electrically controlled so that each of the electronic signals are applied to a separate storage means, respectively, in the time sequence in which they are received at said input means;

readout means connected to said storage means;

display means electrically connected to said readout means for displaying the information stored in said storage means;

time compression means controlling said readout means to enable said readout means to apply the signals stored in each of said storage means to said display means in the sequence in which the signals are received at said input means, said time compression means modifying the time span of sequential application so that this time span is relatively short compared to the time span in which the signals are received at the input means;

trail generating means operably connected to selectively receive information stored in said storage means and for transferring this information to said display means subsequent to the display of this information as controlled by the time compression means, to thereby generate a fading trial on said display means which trail is a composite of the information transferred from said storage means; and transfer means interposed between said readout means and said trail generating means for controlling the transfer of signals from said readout means to said trail generating means.

2. The invention as defined in claim 1 wherein:

said time compression means includes control means for varying the time span of displaying information on said display means.

3. The invention as defined in claim 2 further comprising:

sequencing means controlling the operation of said write means, said transfer means and of the erase function of said plurality of storage means so that signals stored in each of said plurality of storage means are transferred to said trail display storage means before being erased from said plurality of storage means and so that the erase function occurs before the write means applies a new plurality of signals to said plurality of storage means.

4. The invention as defined in claim 1 including trail display storage means having an output connected to said display means;

a transfer means selectively and sequentially connecting each of said plurality of storage means to said trail display storage means, said time compression means causing said readout means to apply the stored signals to said display means immediately prior to the operation of said transfer means, whereby said trail display storage means is supplied with signals representative of object locations at a time prior to the time of occurrence of signals presently being applied to said display means, thus enabling said trail display storage means to apply to said display means a signal producing a fading trail of passed object signals.

5. The invention as defined in claim 4 wherein each of said plurality of storage means is capable of having any information stored therein erased upon receipt of an erase signal, whereby the storage means can be cleared prior to receipt of additional signals from said input means.

6. The invention as defined in claim 5 further comprising:

sequencing means controlling the operation of said write means, said transfer means, and of the erase function of said plurality of storage means so that signals stored in each of said plurality of storage means are transferred to said trail display storage means before being erased from the plurality of storage means and so that the erase function occurs before the write means applies a new plurality of signals to said plurality of storage means.

7. The invention as defined in claim 1 wherein each of said plurality of storage means is capable of having any information stored therein erased upon receipt of an erase signal, whereby the storage means can be cleared prior to receipt of additional signals from said input means.

References Cited by the Examiner

UNITED STATES PATENTS 3,160,881   12/64   Pederzani _____ 343—17.1

FOREIGN PATENTS 838,256   6/60   Great Britain _____ 343—5

CHESTER L. JUSTUS, *Primary Examiner.*